United States Patent
Young et al.

(10) Patent No.: US 6,912,212 B1
(45) Date of Patent: Jun. 28, 2005

(54) METHOD AND APPARATUS FOR MANAGING COMMUNICATION RESOURCES USING DYNAMIC AND STATIC ASSIGNMENT OF COMMUNICATION SLOTS

(75) Inventors: C. David Young, Plano, TX (US); Scott J. F. Zogg, Cedar Rapids, IA (US); Brian R. Roggendorf, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/422,498

(22) Filed: Oct. 21, 1999

(51) Int. Cl.$^7$ ................................................ H04B 7/212
(52) U.S. Cl. ...................................... 370/337; 370/347
(58) Field of Search ............................. 370/321, 322, 370/329, 336, 346–349, 443, 337, 442, 468, 438, 439

(56) References Cited

U.S. PATENT DOCUMENTS 5,594,738 A * 1/1997 Crisler et al. ............... 370/347
5,719,868 A    2/1998 Young
6,353,605 B1 * 3/2002 Rautanen et al. ........... 370/337

* cited by examiner

*Primary Examiner*—Ricky Ngo
*Assistant Examiner*—Soon D. Hyun
(74) *Attorney, Agent, or Firm*—Nathan O. Jensen; Kyle Eppele

(57) ABSTRACT

A method and apparatus for managing communication resources between nodes of a network is disclosed. The network utilizes both dynamic and static assignment of communication time slots. The invention includes a plurality of dynamic nodes wherein communication is accomplished as a result of a node's dynamic assignment to itself of specific time slots from a time multiplex structure. At least one static node is also included in the network. The static node does not participate in the dynamic assignment protocol. Instead, a time slot in said time multiplex structure is pre-assigned for communication with the static node. A dynamic node can serve as a surrogate for a static node, relaying communications between the dynamic and static portions of the network.

27 Claims, 4 Drawing Sheets

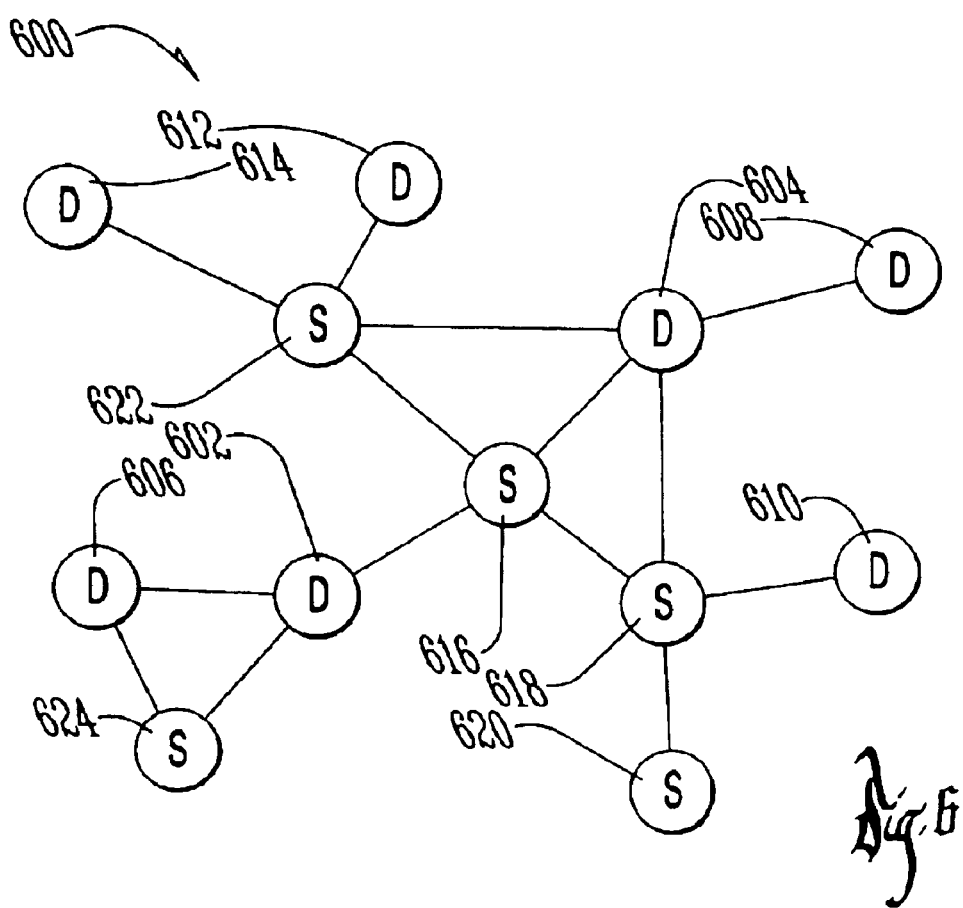

METHOD AND APPARATUS FOR MANAGING COMMUNICATION RESOURCES USING DYNAMIC AND STATIC ASSIGNMENT OF COMMUNICATION SLOTS

The U.S. Government has a paid-up license in this invention and the right in limited circumstances to require the patent owner to license others on reasonable terms as provided for by the terms of contract number MDA972-94-3-0036 awarded by United States Army.

FIELD OF THE INVENTION

The present invention generally relates to a method for managing communication resources between nodes of a network, and more particularly relates to a dynamic, time multiplex slot assignment method and apparatus, and even more particularly relates to methods and apparatus for the pre-assignment of slots in a dynamic, time multiplex slot assignment communication system.

BACKGROUND OF THE INVENTION

Mobile multi-hop broadcast packet radio networks are known for rapid and convenient deployment, self organization, mobility, and survivability. Such a network is illustrated in FIG. 1. A transmission from one node, from node $N_1$ of FIG. 1 for example, is broadcast to all nodes in its "neighborhood". Ultra-high frequency (UHF) systems generally have a neighborhood defined by nodes located within line of sight of the transmitting node. The nodes of such a neighborhood are said to be located within one "hop" of the transmitting node. In FIG. 1, for example, nodes $N_1$, $N_3$, $N_4$, $N_5$, $N_6$, $N_7$ and $N_8$ are members of the neighborhood surrounding node $N_1$.

Nodes $N_2$, $N_9$, $N_{10}$, $N_{11}$ and $N_{12}$ are each located two hops away from node $N_1$ and node $N_{13}$ can be said to be three hops away from node $N_1$. When data transmitted from node $N_1$ is to be propagated multiple hops, the data must be relayed by one or more of node $N_1$'s neighbors. For example, data transmitted by node $N_1$ can be relayed by its neighbor node $N_8$ to a node such as node $N_{12}$ that is located two hops from node $N_1$.

Receivers are generally capable of processing only one transmission at a time. Simultaneous transmissions, also known as collisions, contentions or conflicts, can be avoided by assigning a specific transmission time slot to each communicating node. Several approaches have been developed for assigning slots to nodes. The approach chosen for a particular application is generally a consequence of the type of network application (broadcast, multicast, unicast, datagrams, virtual circuits, etc.) at issue. Since the problem of optimally assigning slots is mathematically intractable, a heuristic approach has been applied. This approach resulted in the development of an integrated protocol that both chooses the number of slots to assign to each neighboring node and coordinates their activation in the network.

Many applications require self-organizing, wireless networks that can operate in dynamic environments and provide peer-to-peer, multi-hop, multi-media communications. Key to this technology is the ability of neighboring nodes to transmit without interference. Neighboring nodes transmit without interference by choosing time slots and channels that do not cause collisions at the intended unicast or multicast receivers. The Unifying Slot Assignment Protocol (USAP), which is disclosed in U.S. Pat. No. 5,719,868, provides a protocol establishing such a communication system. USAP is a dynamic assignment protocol that monitors the RF environment and allocates the channel resources on demand. It automatically detects and resolves contention between nodes for time slots, such contention arising for example from changes in connectivity. The specification of U.S. Pat. No. 5,719,868, issued Feb. 17, 1998, is hereby incorporated herein by reference, including all drawings and appendices.

In certain applications, however, it is desirable or necessary to establish a network including nodes that do not participate in a dynamic assignment protocol alongside nodes that do use a dynamic assignment protocol. Such a system would permit nodes to be included in the network that are not capable of participating in the dynamic assignment protocol used by the network. For instance, nodes using older technology or nodes having insufficient computing resources could be integrated with the network. In addition, such a method could be used to help guarantee adequate channel capacity to a node deemed critical to network operation.

Consequently, there exists a need for a dynamic assignment communication system capable of including nodes that do not directly participate in the dynamic assignment protocol.

SUMMARY OF THE INVENTION

It is an object of the present invention to provide an enhanced dynamic assignment communication system.

It is a feature of the present invention to utilize pre-assigned communication slots.

It is an advantage of the present invention to enable the inclusion of static nodes, which do not directly participate in a dynamic assignment protocol, in the same network as nodes that do use a dynamic assignment protocol.

The present invention is an apparatus and method for pre-assigning communication slots in a dynamic assignment protocol. For example, in a network performing dynamic assignments, the invention can facilitate inclusion of one or more static nodes that do not participate in the dynamic assignment protocol. A node may be a static node by virtue of having insufficient computing resources to participate in the dynamic protocol.

By way of further example, it is desirable in some applications to purposely exclude a node from direct participation in the dynamic assignment protocol while maintaining the status of that node as a member of the network. For instance, a node critical to network operation may be implemented as a static node. In such a circumstance, the node's transmissions and receptions are allocated by a method other than the network's dynamic assignment protocol. The present invention is carried out in a "seam-less" manner in the sense that conflict-free integration of a static node with the network is accomplished without requiring modification of the static node.

Accordingly, the present invention is a heuristic to guarantee communication slots in a dynamic slot assignment environment.

BRIEF DESCRIPTION OF THE DRAWINGS

The invention may be more fully understood by reading the following description of the preferred embodiments of the invention, in conjunction with the appended drawings wherein:

FIG. 6 is a diagram of a network of nodes, the network containing nodes participating in a dynamic assignment protocol and nodes that are static and do not participate in the dynamic assignment protocol.

DETAILED DESCRIPTION

The present invention assumes that the communication hardware of each node includes a simplex transceiver with an omnidirectional antenna. Thus, a node cannot transmit and receive at the same time, and a node cannot receive from more than one node at a time. In fact, two nodes transmitting at the same time, both being within transmission range of an intended receiver, will prevent the receiver from receiving any packet successfully. The data structures and rules can be modified, however, to enable the system to include full duplex radios or radios with multiple transmitters and receivers.

Figure 1:
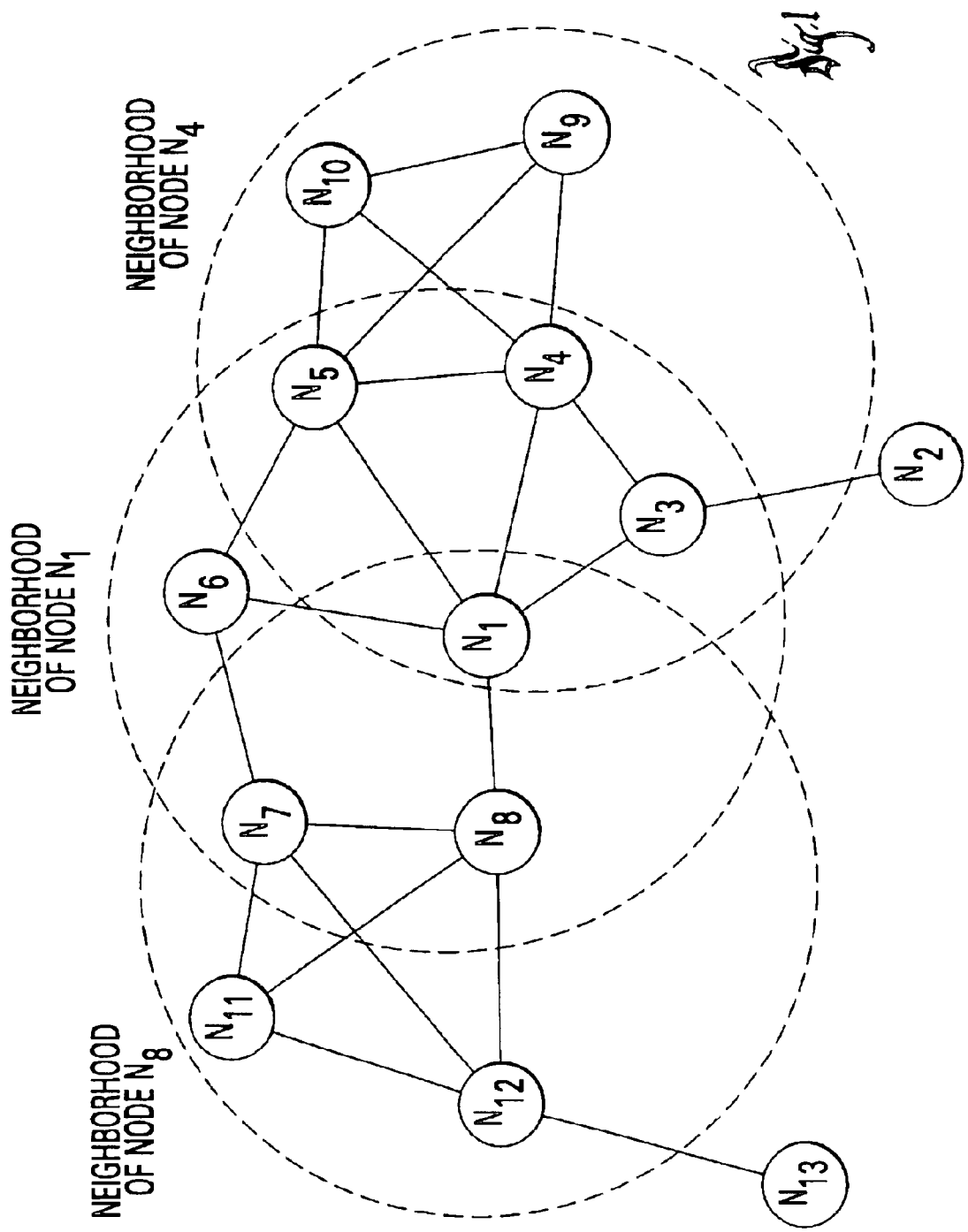
FIG. 1 is a diagram of a network of nodes, the diagram also illustrating the neighborhood associated with three of the illustrated nodes.
Figure 2:
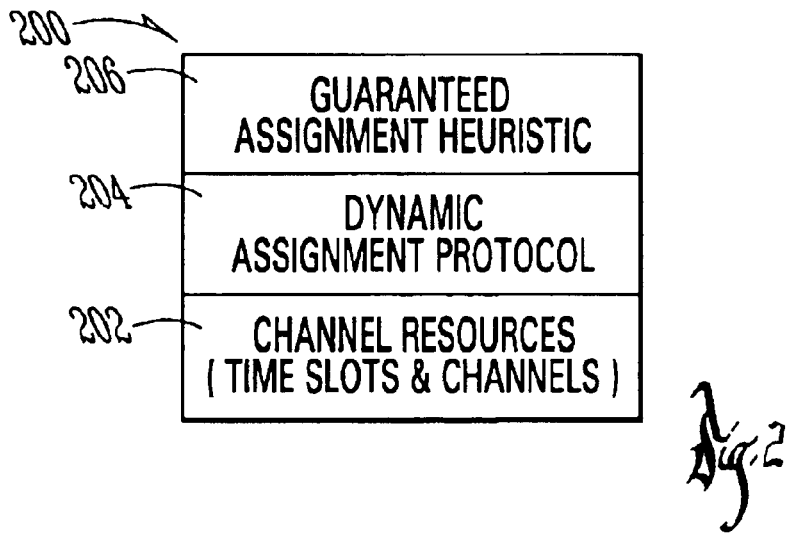
FIG. 2 is a block diagram illustrating the general structure of the multiple access system of the present invention.

FIG. 2 depicts the general relationships between the various components of the system 200 of the present invention. The system 200 comprises a dynamic assignment protocol, a guaranteed slot heuristic and the channel resources. Additional heuristics can also be included with the present invention. At the lowest level are the channel resources 202. As described below and in the incorporated patent, the channel resources 202 can include the time slots of a time multiplex structure. In addition, the channel resources 202 can also include a plurality of different communication channels associated with each time slot.

The dynamic assignment protocol 204 occupies the next level. The dynamic assignment protocol 204 can be the USAP approach or some other suitable dynamic assignment protocol. The guaranteed assignment heuristic 206 is integrated into the system 200 by the dynamic assignment protocol 204. The dynamic assignment protocol 204 can also integrate other higher-level heuristics (not shown) into the system 200. The higher-level heuristics are designed and chosen to meet the requirements of the application at hand.

Prior to the development of USAP, a heuristic approach was typically taken to design an application specific protocol that both chose the number of time slots to assign to each neighboring node and coordinated their activation. The USAP approach separates the slot assignment mechanism from the heuristic and creates a single generalized protocol for reliably choosing the slots and coordinating their activation. USAP can be used to support higher layer heuristics.

A node can transmit to its neighbors via essentially one of two different methods. One method, node activation, allows only one active transmitter in a neighborhood in a given time slot. The other method, link activation, can permit more than one simultaneous transmission in the same time slot.

Figure 3:
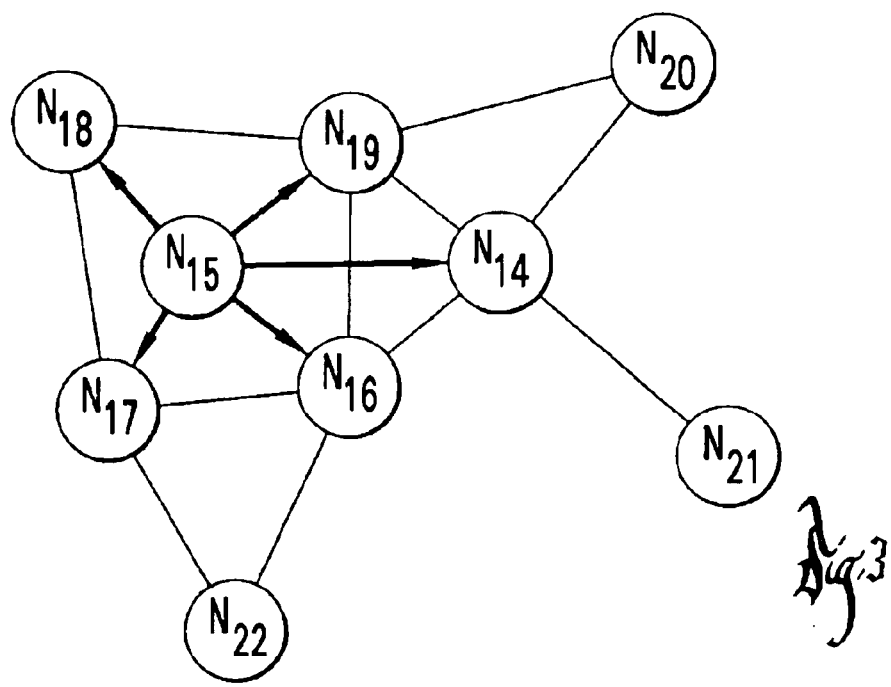
FIG. 3 is a diagram illustrating a node activation style of communication.

In the node activation technique, a single transmitting node communicates data to all of its neighbors simultaneously rather than on an individual basis. Node activation, also known as multicast or broadcast communication, is especially well suited for applications like address resolution and conferencing. The node activation technique is illustrated in FIG. 3. In FIG. 3, a transmitting node $N_{15}$ is sending a broadcast communication to each of its neighbor nodes $N_{14}$, $N_{16}$, $N_{17}$, $N_{18}$ and $N_{19}$.

Figure 4:
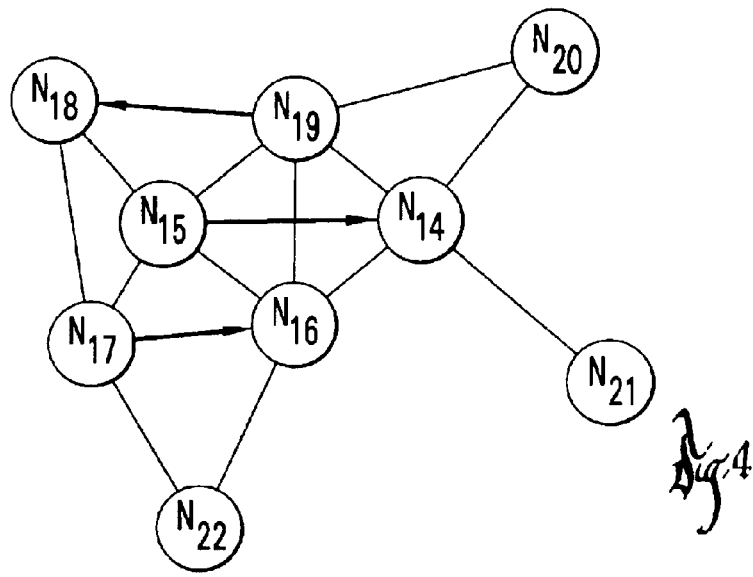
FIG. 4 is a diagram illustrating a link activation style of communication.

In the link activation technique, the transmitting node has only one intended receiver. Link activation, also known as unicast communication, better serves high volume point-to-point traffic. The link activation technique is illustrated in FIG. 4. Three unicast transmissions are occurring simultaneously. In FIG. 4, node $N_{15}$ is transmitting a unicast message to node $N_{14}$, node $N_{17}$ is transmitting a unicast message to node $N_{16}$ and node $N_{19}$ is transmitting a unicast message to node $N_{18}$.

Figure 5:
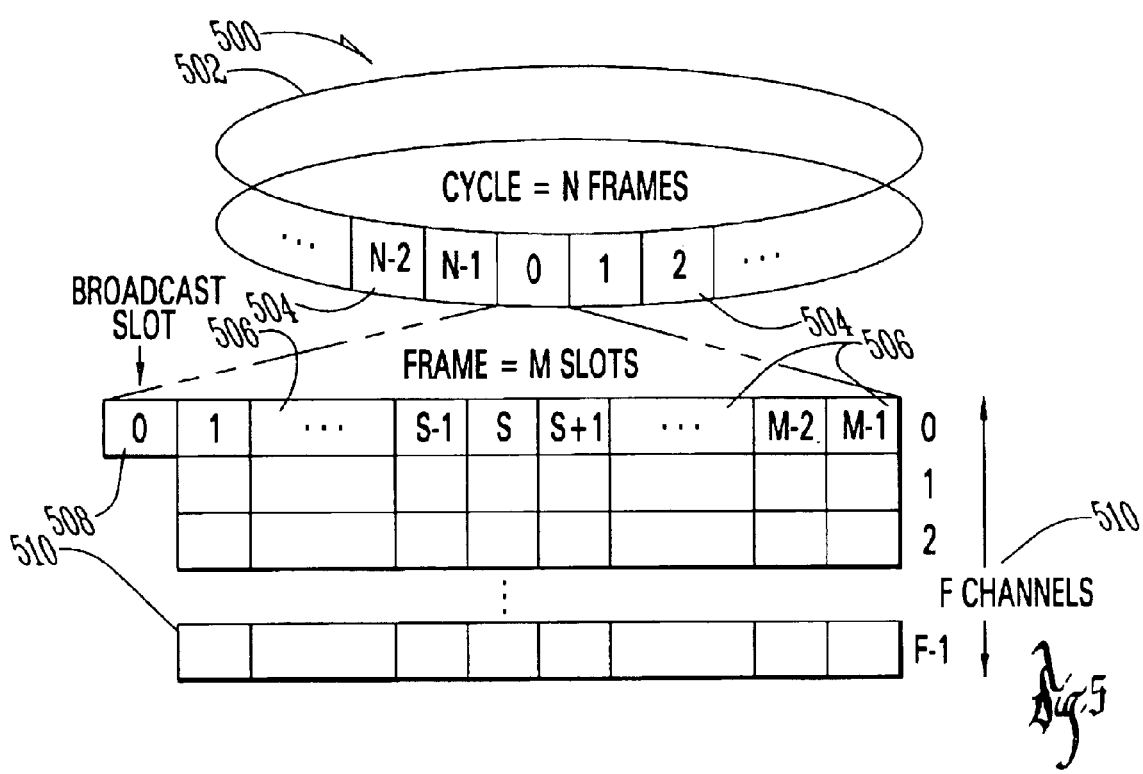
FIG. 5 is a diagram of a time division multiple access structure suitable for use with the present invention.

Referring to FIG. 5, a time multiplex structure 500 for use with the present invention is depicted. The time multiplex structure 500 of FIG. 5 is a time division multiple access structure. One cycle 502 of the structure 500 includes "N" frames 504. The number of frames 504 required for a particular embodiment is determined by the specifics of the underlying application. Each of the "N" frames 504 has a structure identical to that described below.

The time allocated to each frame 504 is shown divided into "M" distinct time slots 506. It will be appreciated that different numbers of time slots can be used in the various embodiments of the invention. The first slot of each frame 504 is a broadcast slot 508 for network management control packets. One of the N broadcast slots 508 is assigned to each node in the network. Therefore, for a network having N nodes, each node will transmit its control packet once during each cycle 502. More than one broadcast slot per frame can be used if it is desirable for each node to transmit multiple control packets per cycle. It is also possible to dynamically assign these broadcast slots using the USAP approach described below.

Each frame 504 can also include multiple frequency channels 510. In FIG. 5, "F" different frequency channels are illustrated. Different embodiments of the invention include different numbers of time slots 506, channels 510 and/or frames 504.

To determine whether a slot and a channel are available for allocation to a broadcast or a unicast transmission, the USAP methodology of incorporated U.S. Pat. No. 5,719,868 may be applied. Other alternative methodologies exist, however, and can be used in lieu of the USAP methodology.

In the USAP approach, specific constraints on communication slot allocation are included to avoid interference at any node located within two hops of the transmitting node. For a system, such as USAP, including multiple frequency channels, an allocation involves specification of both a time slot and a frequency channel. For a unicast transmission from a node i to a neighboring node j, the allocation must be one:

that has not already been assigned to node i or node j;

in which node i's neighboring nodes are not receiving; and in which node j's neighboring nodes are not transmitting.

For a multicast communication originating from a node i, the allocation by node i must be one:

that has not already been assigned to node i or any of its neighboring nodes; and in which none of node i's neighbors' neighbors are transmitting.

A node insures that its allocations satisfy the above constraints by sharing the following USAP slot sets with its neighboring nodes;

STi—allocations where a node is transmitting;

SRi—allocations where a node is receiving; and

NTi—allocations where a node's neighbors are transmitting.

The size of the above-defined slot sets will vary according to the network density and the number of slots and channels being managed. To minimize the size required for the control packets, the slot set information can be encoded, for example, as bit maps or as lists. Sharing of the slot set information via the control packets enables USAP to 1) select non-conflicting transmit allocations consistent with the most recent topology measurements, and 2) detect and report conflicts caused by topology changes.

After a transmit allocation is selected, the node has the option of transmitting immediately or waiting until a confirmation is received from each neighbor. The unconfirmed mode is appropriate when it is acceptable to have momentary conflicts due to coincident changes in connectivity or conflicting allocations. The confirmed mode verifies that all neighbors are aware of the allocation and that nothing has occurred to make the allocation inconsistent with the current topology or the other nodes' allocations.

To select a slot, a node first generates the set of slots that are not available because they are already in use locally. In the description that follows, the subscript "i" denotes information about the node performing the allocation and "j" denotes the corresponding information reported by a neighboring node.

The assignments are represented by:

S=set of M time slots

F=set of F frequency channels.

For a given channel and time slot pair (s,f), the allocating node's transmit/receive sets are:

$STN_i(s,f)$=set of neighbors to which node i transmits on (s,f)

$SRN_i(s,f)$=set of neighbors from which node i receives on (s,f).

The following sets are then derived:

$ST_i(s,f)$=1 if $STN_i(s,f)$ not empty, else 0

$SR_i(s,f)$=1 if $SRN_i(s,f)$ not empty, else 0.

The neighbor node transmit/receive sets are:

$ST_j(s,f)$=the $ST_i(s,f)$ reported by neighbor j $SR_j(s,f)$=the $SR_i(s,f)$ reported by neighbor j.

Next, the following sets can be derived:

$NT_i(s,f)=\cup ST_j(s,f)$ over all neighbors j of node i $NR_i(s,f)=\cup SR_j(s,f)$ over all neighbors j of node i $NT_j(s,f)$=the $NT_i(s,f)$ reported by neighbor j.

If node i or a neighbor j is transmitting or receiving (on any channel) in slot s, they are blocked from performing any other communication during slot s. To this end, the following derived sets are useful:

$B_i(s)=ST_i(s,f) \cup SR_i(s,f)$ for any f $B_j(s)=ST_j(s,f) \cup SR_j(s,f)$ for any f.

To decide which slots and channels are available for unicast allocation, a node i constructs the blocked allocations for transmitting to a given neighbor node j by excluding allocations:

that have been already assigned to either node: $B_i(s) \cup B_j(s)$ in which node i's neighbors are receiving: $NR_i(s,f)$ in which node j's neighbors are transmitting: $NT_j(s,f)$.

This information is combined as follows:

Blocked(i,j,s,f)=$B_i(s) \cup B_j(s) \cup NR_i(s,f) \cup NT_j(s,f)$

Blocked(i,j,s,f)=1 if node i cannot transmit to node j in (s,f), else

Blocked(i,j,s,f)=0.

To decide which slots and channels are available for broadcast allocation, a node i constructs the blocked allocations for transmitting to all of its neighbors by excluding allocations:

that have been already assigned to i: $B_i(s)$ already assigned to any of node i's neighbors: $\cup B_j(s)$ in which any of node i's neighbors' neighbors are transmitting: $\cup NT_j(s,f)$ This information is combined as follows:

Blocked(i,s,f)=$B_i(s) \cup B_j(s) \cup NT_j(s,f)$

Blocked(i,s,f )=1 if i cannot transmit to any of its neighbors in (s,f), else

Blocked(i,s,f)=0.

The data structures of the previous sections are designed to prevent conflicts at a receiver due to multiple transmitters within its neighborhood using the same frequency in the same slot. In some networks it may be desirable to reduce the noise floor at the receivers by adding an additional hop of isolation before an allocation is reassigned. This can be accomplished by defining the set of nodes that are transmitting within three hops of node i on an allocation as:

$NNT_i(s,f)=\cup NT_j(s,f)$ over all neighbors of node i.

If this is also included in the control packet and stored at the neighbor of node i as $NNT_j(s,f)$, and if Blocked (i,j,s,f) is generated as follows, conflicting transmissions within three hops of a transmitter will be prevented:

Blocked(i,j,s,f)=$B_i(s) \cup B_j(s) \cup NR_i(s,f) \cup NT_j(s,f) \cup NNT_j(s,f)$ Blocked(i,j,s,f)=1 if node i cannot transmit to node j in (s,f), else Blocked(i,j,s,f)=0.

Now referring to FIG. 6, there is shown a network 600 including dynamic and static nodes pursuant to the teachings of the present invention. The dynamic nodes 602, 604, 606, 608, 610, 612 and 614 directly participating in the dynamic assignment protocol are indicated by a "D." The static nodes 616, 618, 620, 622 and 624, nodes that do not directly participate in the dynamic assignment protocol, are indicated by an "S." The number of nodes depicted in FIG. 6 is merely illustrative of one embodiment of the invention. Different embodiments have different numbers of nodes and different proportions of dynamic to static nodes.

The static nodes 616, 618, 620, 622 and 624 of the network 600 may be, for example, legacy nodes that do not have the computing resources to participate in the dynamic assignment protocol practiced by the dynamic nodes 602, 604, 606, 608, 610, 612 and 614. Alternatively, or additionally, a static node 616, 618, 620, 622 and 624 could be a node critical to network operation that requires a guaranteed conflict-free communication schedule. The dynamic assignment protocol practiced by the dynamic nodes 602, 604, 606, 608, 610, 612 and 614 can be, for example, the USAP approach.

In order to integrate the static nodes 616, 618, 620, 622 and 624 with the network 600, at least one time slot of the time multiplex structure is pre-assigned with respect to each static node. The pre-assigned slot can be designated as a broadcast or as a unicast communication slot. Further, a pre-assigned time slot can also be allocated to one or more dynamic nodes. In one embodiment, a pre-assigned slot is used in a network composed entirely of dynamic nodes (to guarantee a conflict-free transmission for example). The use of a pre-assigned slot eliminates down time that may otherwise occur during initialization and topology changes.

When pre-assigned slots are implemented in a network composed only of dynamic nodes, the pre-assignment has little affect on their operation. Since the slots are pre-assigned, they are known by the nodes with which they are associated. Further, the pre-assigned slots will be reported pursuant to the rules of the dynamic assignment protocol. In a network using USAP, for example, the pre-assigned slots will be included in the STi, SRi and NRi slot sets. The STi, SRi and NRi slot sets are then shared with neighboring nodes in the control packet that each dynamic node transmits during the broadcast slot 508, FIG. 5.

Likewise, when a network includes both dynamic and static nodes, as in FIG. 6 for example, pre-assigned slots can be seamlessly implemented. The static nodes of such a network do not need to share scheduling information, USAP slot sets for example, with their neighbors. Even two dynamic nodes that are separated by two hops and an intervening static node, such as dynamic node 602 and dynamic node 604, can schedule communications without receiving information such as a control packet from their common static neighbor.

To illustrate, the slot pre-assigned to static node 616 will be known to dynamic node 602 and to dynamic node 604. Therefore, neither dynamic node 602, 604 will schedule a communication in the pre-assigned slot. Further, since the dynamic node 604 can only transmit to static node 616 in the pre-assigned slot, and since the pre-assigned slot is also known to the other dynamic node 602, dynamic node 604 will not schedule a transmission to the static node 616 in the same slot and frequency pair in which a neighbor of static node 616 is transmitting. Accordingly, due to the constraints discussed above, as long as a dynamic node makes its allocations from the set of available allocations defined by the dynamic assignment protocol, it will not conflict with transmissions of the other dynamic or static nodes.

In order for communication to flow between the dynamic nodes and the static nodes of the network 600, slots must be pre-assigned to the dynamic nodes. Dynamic nodes accessing these pre-assigned slots can serve as relays or gateways between the dynamic and static members of the network. In other words, a dynamic node can act as a surrogate for a neighboring static node. Using the dynamic assignment protocol and the pre-assigned slots, the surrogate can pass communications between the neighboring static node and other neighboring nodes of the surrogate node. Thus, the present invention permits the network to benefit from both the stability of a pre-planned network and the flexibility of a dynamic assignment protocol.

It is thought that the method and apparatus of the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantage. The form herein described is merely an exemplary embodiment thereof.

What is claimed is:

1. A method of managing communication between nodes of a network, involving both dynamic and static assignment of communication time slots, the method comprising:

establishing a network comprising a plurality of dynamic nodes, network communication being accomplished via assignment of time slots of a time multiplex structure, said plurality of dynamic nodes participating in a dynamic assignment protocol, each of said plurality of dynamic nodes being capable of assigning itself a time slot from available time slots of said time multiplex structure, said network further comprising at least one static node not having communication resources to participate in the dynamic assignment protocol; and pre-assigning a time slot in said time multiplex structure to said at least one static node.

2. The method of claim 1, further comprising the step of:

pre-assigning a time slot in said time multiplex structure to at least one dynamic node of said plurality of dynamic nodes.

3. The method of claim 2, wherein said at least one dynamic node of said plurality of dynamic nodes is a surrogate node coordinating communication between said at least one static node and said plurality of dynamic nodes.

4. The method of claim 1, further comprising a plurality of static nodes.

5. The method of claim 1, wherein said at least one static node is not capable of participating in the dynamic assignment protocol.

6. The method of claim 1, wherein said time multiplex structure comprises a time division multiple access protocol.

7. The method of claim 1, further comprising a frequency division multiple access protocol operating in conjunction with said time multiplex structure.

8. The method of claim 1, wherein said dynamic assignment protocol comprises a unifying slot assignment protocol.

9. A communication system, comprising:

a network of nodes, each node being capable of communication during time slots of a time multiplex structure;

a plurality of nodes of said network of nodes participating in a dynamic assignment protocol, each node of said plurality of nodes being capable of assigning itself a time slot from available time slots of said time multiplex structure; and at least one static node, said at least one static node belonging to said network of nodes and not having communication resources to participate in the dynamic assignment protocol;

wherein said at least one static node is pre-assigned a time slot in a frame of said time multiplex structure.

10. The communication system according to claim 9, wherein said at least one static node is a node not capable of participating in said dynamic assignment protocol.

11. The communication system according to claim 9, wherein said dynamic assignment protocol comprises a unifying slot assignment protocol.

12. The communication system according to claim 9, wherein said time multiplex structure comprises a time division multiple access structure.

13. The communication system according to claim 9, wherein said network of nodes further comprises a frequency division multiple access structure integrated with said time multiplex structure.

14. The communication system according to claim 9, further comprising a dynamic node participating in said dynamic assignment protocol, said dynamic node having a pre-assigned broadcast time slot in a frame of said time multiplex structure.

15. The communication system according to claim 14, wherein said dynamic node serves as a surrogate for said at least one static node.

16. A communication system, comprising:

a network of nodes, each node being capable of communication during time slots of a time multiplex structure;

first dynamic node means for participating in a dynamic assignment protocol, said first dynamic node means being capable of assigning itself a time slot from available time slots of said time multiplex structure, said first dynamic node means being a member of said network of nodes; and static node means for participating in the network, said static node means belonging to said network of nodes and not having communication resources to participate in the dynamic assignment protocol;

wherein said static node means is pre-assigned a time slot in a frame of said time multiplex structure.

17. The communication system according to claim 16, further comprising second dynamic node means for participating in said dynamic assignment protocol, said second dynamic node means having a pre-assigned time slot in a frame of said time multiplex structure.

18. The communication system according to claim 17, wherein said second dynamic node means serves as a surrogate for said static node means.

19. The method of claim 1, wherein said at least one static node does not participate in the dynamic assignment protocol even though it is otherwise capable of doing so.

20. The communication system according to claim 9, wherein said at least one static node does not participate in the dynamic assignment protocol even though it is otherwise capable of doing so.

21. A communication system, comprising:

a network of nodes, each node being capable of communication during time slots of a time multiplex structure;

a plurality of nodes of said network of nodes participating in a dynamic assignment protocol, each node of said plurality of nodes being capable of assigning itself a time slot from available time slots of said time multiplex structure;

at least one static node, said at least one static node belonging to said network of nodes, said at least one static node having a pre-assigned a time slot in a frame of said time multiplex structure and not having communication resources to participate in the dynamic assignment protocol; and a dynamic node participating in said dynamic assignment protocol, said dynamic node having a pre-assigned time slot in a frame of said time multiplex structure, said dynamic node being capable of serving as a surrogate for communication with said at least one static node.

22. A method of managing communication between nodes of a network, involving both dynamic and static assignment of communication time slots, the method comprising:

establishing a network comprising a plurality of dynamic nodes, network communication being accomplished via assignment of time slots of a time multiplex structure, said plurality of dynamic nodes participating in a dynamic assignment protocol, each of said plurality of dynamic nodes being capable of assigning itself a time slot from available time slots of said time multiplex structure, said network further comprising at least one static node not having communication resources to participate in the dynamic assignment protocol;

pre-assigning a time slot in the time multiplex structure to at least one static node;

pre-assigning a time slot in the time multiplex structure to at least one dynamic node of the plurality of dynamic nodes; and using the at least one dynamic node with a pre-assigned time slot to facilitate communication between the at least one static node and the plurality of dynamic nodes.

23. A communication system, comprising:

a network of nodes, each node being capable of communication during time slots of a time multiplex structure;

first node means for participating in a dynamic assignment protocol, said first node means being capable of assigning itself a time slot from available time slots of the time multiplex structure; and second node means for participating in the network of nodes but not having communication resources to participate in the dynamic assignment protocol;

wherein said second node means is pre-assigned a time slot in a frame of said time multiplex structure.

24. The communication system according to claim 23, further comprising third node means for participating in said dynamic assignment protocol, said third node means having a pre-assigned time slot in a frame of said time multiplex structure.

25. The communication system according to claim 24, wherein said third node means serves as a surrogate for communication with said second node means.

26. A method of managing communication between nodes of a network, involving both dynamic and static assignment of communication time slots, the method comprising:

establishing a network comprising a plurality of dynamic nodes, network communication being accomplished via assignment of time slots of a time multiplex structure, said plurality of dynamic nodes participating in a dynamic assignment protocol, each of said plurality of dynamic nodes being capable of identifying an available time slot of said time multiplex structure and of assigning itself an identified available time slot, said network further comprising at least one static node not having communication resources to participate in the dynamic assignment protocol; and pre-assigning a time slot in said time multiplex structure to said at least one static node.

27. A communication system, comprising:

a network of nodes, each node being capable of communication during time slots of a time multiplex structure;

a plurality of nodes of said network of nodes participating in a dynamic assignment protocol, each node of said plurality of nodes being capable of assigning itself a time slot from available time slots of said time multiplex structure; and at least one static node, said at least one static node belonging to said network of nodes and not having communication resources to participate in the dynamic assignment protocol;

wherein said at least one static node cannot request a time slot but instead is initially-assigned a time slot in a frame of said time multiplex structure.

\* \* \* \* \*